Nov. 17, 1970 SHIGEO KUWAYAMA ET AL 3,541,305
PLATE-TYPE HEATER
Filed Nov. 12, 1968
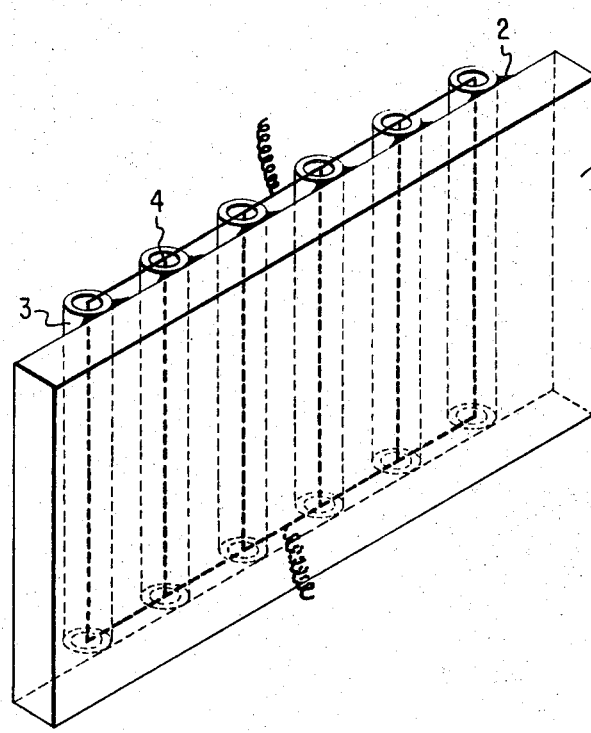
INVENTORS.
SHIGEO KUWAYAMA
MIKIHIKO YAGI
TAKAYUKI KURIYAMA

United States Patent Office 3,541,305
Patented Nov. 17, 1970

3,541,305
PLATE-TYPE HEATER
Shigeo Kuwayama, Mikihiko Yagi, and Takayuki Kuriyama, Odawara-shi, Kanagawa, Japan, assignors to Fuji Photo Film Co., Ltd., Kanagawa, Japan
Filed Nov. 12, 1968, Ser. No. 774,752
Claims priority, application Japan, Nov. 15, 1967, 42/96,336
Int. Cl. H05b 3/68
U.S. Cl. 219—464    4 Claims

ABSTRACT OF THE DISCLOSURE

A plate-type heater of ceramic material has a plurality of ceramic tubes bonded to one surface of the plate by heat resistive adhesive with the tubes carrying individual heater elements, the thermal coefficient of expansion for the plate and tube being similar and less than $25 \times 10^{-7}$ centimeters per centimeter degree centigrade.

BACKGROUND OF THE INVENTION

Field of the invention

This invention relates to electric resistance heaters, and more particularly, to plate-type heaters.

In conventional plate-type heaters, a band or wire constituting a metal resistance heating element is held or positioned between mica sheets, and during heating, is pressed against a plate formed of metal or crystalline glass. In such assemblies, however, it is difficult to keep uniformity of contact with the mica sheets holding the band or wire type metal resistance heating elements and the plate-like object and where the contact between the mica sheet and the plate is not good, the metal resistance heating element becomes superheated locally to form a variance in temperature and in extreme cases, the metal resistance heating element breaks in these areas. Accordingly, the maximum allowable temperature for the prior art structures is approximately 400° C. At temperatures higher than this, there is local variation in mica sheet contact, resulting in variations in temperature along the surface of the plate-type heater, and thus, chances in rupture of the metal resistance heating element itself.

SUMMARY OF THE INVENTION

This invention is directed to an improved plate-type heater consisting of a ceramic plate and a plurality of ceramic tubes which are bonded to a surface of the plate, the ceramic tubes carrying individual heater elements with the plate and tubes comprising ceramic material having similar thermal coefficients of expansion. Preferably, the thermal coefficients of expansion of the ceramic plate and tube material is less than $25 \times 10^{-7}$ cm./cm. ° C.

The tubes are thermally bonded to the plate surface by heat resisting adhesive comprising a slurry of crystalline glass powder and water glass in an amount of 65% or mor by weight of powdered crystalline glass and 35% or less by weight of water glass.

BRIEF DESCRIPTION OF THE DRAWING

The single figure is a perspective view of the improved ceramic plate-type heater of the present invention.

DESCRIPTION OF THE PREFERRED EMBODIMENT

Referring to the drawing, the plate-type heater of the present invention includes a flat, relatively thin plate 1 of ceramic, such crystalline glass, glass or quartz, to one major surface of which is bonded a plurality of longitudinally spaced ceramic tubes 3 by means of a heat resisting adhesive 2. Each ceramic carries a metal resistance heating element 4, such as Nichrome wire, which is readily inserted within the ceramic tubes. The coefficient of thermal expansion of the ceramic tubes 3 and the plate 1 must be less than about $25 \times 10^{-7}$ cm./cm. ° C. for the various conditions of use wherein the plate-type heater may be subjected to rapid cooling and heating, in which case, for instance, the plate, when energized, may be splashed with water upon being heated to a temperature higher than 500° C.

The heat resisting adhesive 2, which bonds the ceramic tubes to one surface of the plate 1, is preferably a slurry of a mixture of 65% by weight or more of powdered crystalline glass (whose expansion coefficient after crystallization is less than $25 \times 10^{-7}$ cm./cm. ° C.) and 35% or less clay in water. A slurry of crystalline glass powder and water glass may be readily used as the heat resisting adhesive of the present invention. This slurry is applied to the parts to be bonded and dried and the assembly of tubes and plates subsequently bonded by heating the same.

The plate-type heater of the present invention is different from the known heaters which comprise mica sheets with metal resistance heating elements at various points along the mica sheet surface. For example, the expansion coefficients of the ceramic tubes 3 and the plate 1 are similar. Accordingly, the ceramic tubes 3 carrying the heating elements 4 are formed into a uniform or unitary body with plate 1 and there are little thermal stresses due to energization of the Nichrome wire heating elements 4, nor does there exist an unevenness of temperature along the plate surface and in the area of the metal resistance heating element, thus eliminating breaking of the same due to temperature differential. Further, the maximum temperature of the heater may be raised to about 70° C. without deformation or destruction. The heater of the present invention further resists rapid cooling and heating since the expansion of the coefficient of the ceramic is small and readily adapted to various purposes to which the heater is put, such as a heater for cooking, a conventional electric heater, a room heater, etc. The advantages of the plate-type heater of the present invention are readily apparent from the above description, the heating range is large, heating is moderate, the heater may be readily cleaned and there is no danger of electrical shock.

While the invention has been shown and described with reference to a preferred embodiment thereof, it will be understood by those skilled in the art that various changes in the form and details therein may be made without departing from the spirit and scope of the invention.

What is claimed is:
1. A plate-type heater comprising: a ceramic plate and a plurality of ceramic tubes carrying individual electrical heater elements bonded to one surface thereof with the plate and tubes having similar thermal coefficients of expansion, the thermal coefficient of expansion for said ceramic plates and said ceramic tubes is less than $25 \times 10^{-7}$ cm./cm. °C.

2. The plate-type heater as claimed in claim 1 wherein said tubes are thermally bonded to said plate surface by a heat resisting adhesive.

3. The plate-type heater as claimed in claim 2 wherein said heat resisting adhesive comprises a slurry of crystalline glass powder and water glass.

4. The plate-type heater as claimed in claim 2 wherein said heat resisting adhesive comprises a slurry of 65% or more by weight of powdered crystalline glass and 35% or less by weight of water glass.

References Cited

UNITED STATES PATENTS

| | | | |
|---|---|---|---|
| 2,723,338 | 11/1955 | Antoni | 219—352 X |
| 2,987,300 | 6/1961 | Greene | 165—171 X |
| 2,995,645 | 8/1961 | Rankin | 219—347 X |
| 3,155,814 | 11/1964 | Appleman et al. | 219—407 |
| 3,335,261 | 8/1967 | Siegla et al. | 219—468 |
| 3,436,524 | 4/1969 | Pauls | 219—347 |

VOLODYMYR Y. MAYEWSKY, Primary Examiner

U.S. Cl. X.R.

219—345, 540, 553; 165—171